United States Patent [19]

Lisson et al.

[11] Patent Number: 5,221,834
[45] Date of Patent: Jun. 22, 1993

[54] METHOD FOR PROVIDING FEEDBACK CORRECTION FOR AN IMAGING DEVICE

[75] Inventors: Jerold B. Lisson, Henrietta; Darryl I. Mounts, Pittsford; Dale K. Mack, Rochester, all of N.Y.

[73] Assignee: Eastman Kodak Company, Rochester, N.Y.

[21] Appl. No.: 723,141

[22] Filed: Jun. 28, 1991

[51] Int. Cl.$^5$ .................. G01M 11/00; G01J 1/00
[52] U.S. Cl. .................. 250/201.9; 356/124.5; 364/DIG. 1; 364/224.8
[58] Field of Search .................. 364/224.8; 65/160, 29, 65/61; 359/642, 838, 900; 356/124, 124.5, 121; 250/201.9

[56] References Cited

U.S. PATENT DOCUMENTS

| | | | |
|---|---|---|---|
| 3,930,732 | 1/1976 | Holly | 356/124.5 |
| 4,772,120 | 9/1988 | Pointeau | 356/124.5 |
| 4,875,765 | 10/1989 | Vandenberg et al. | 359/849 |
| 4,950,878 | 8/1990 | Ulrich et al. | 356/354 X |
| 4,993,823 | 2/1991 | Schaffer, Jr. et al. | 359/849 |
| 5,126,550 | 6/1992 | Lisson et al. | 250/201.9 |

Primary Examiner—Bruce Y. Arnold
Assistant Examiner—David R. Parsons
Attorney, Agent, or Firm—Kevin A. Sembrat

[57] ABSTRACT

A method for assessing and correcting via feedback, the optical quality of an imaging device. The method has an advantage of expanding the applicability of a classical optical transfer function, heretofore a measure only of global imaging device performance, so that it can provide feedback information for correcting an imaging device defect in terms of local area modifications.

In a optical system which comprises a source of radiation that can output a radiation beam and an imaging device to be corrected and which can image the radiation beam to produce an imaged beam, the method comprises the steps of (1) sampling the imaged beam by an opaque mask defining at least two apertures, for generating local wavefront errors at a pupil position defined by a location of the mask, (2) computing a localized optical transfer function (LOTF) for the localized wavefront errors transmitted through the sampling apertures, the LOTF being defined by an equation relating it to a local modulation transfer function (LMTF) and a local phase transfer function (LPTF), (3) generating from the LOTF a performance map comprising a local optical quality factor (LOQF) comprising the ratio of computed LMTF to a diffraction limited LMTF and the LPTF, and (4) generating from the performance map correction feedback for applying a controlled action to the imaging device.

8 Claims, 15 Drawing Sheets

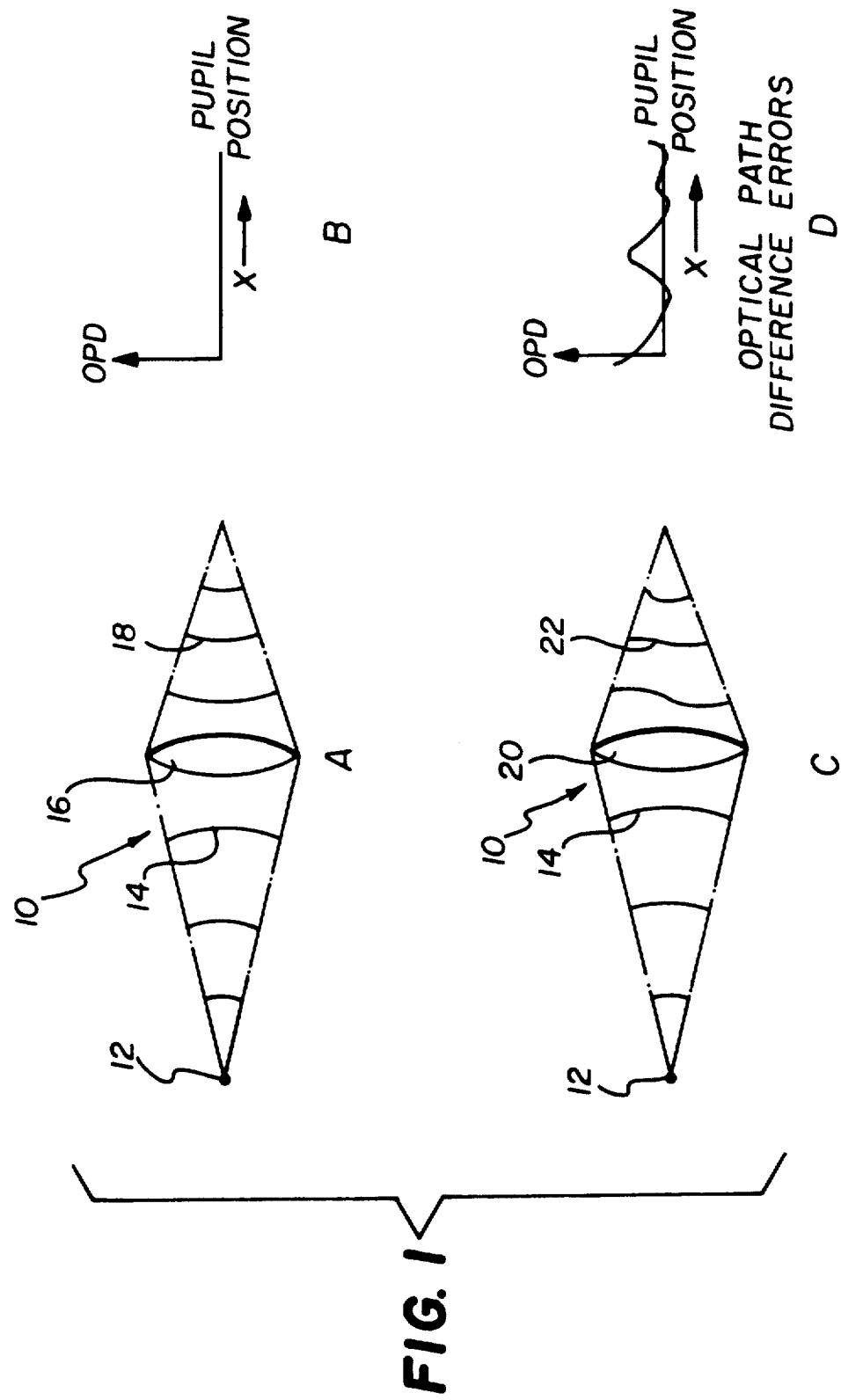

SAMPLE APERTURE SEPARATION = D
SPATIAL FREQUENCY = $\lambda Z/D$

LOCAL TO GLOBAL PERFORMANCE
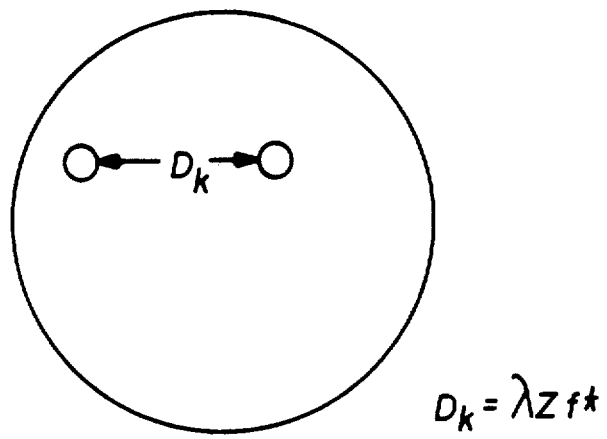
$D_k = \lambda Z f^*$
$$\text{GLOBAL } \overrightarrow{OQF(f^*)} = \sum_{k=1,m} (\overrightarrow{LOQF_k(f^*)})/m$$
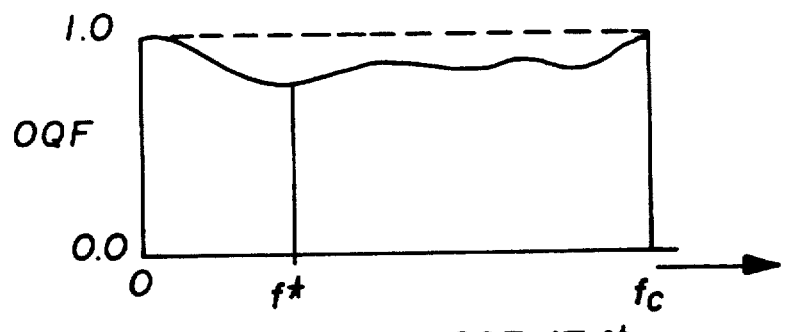
GLOBAL OQF AT $f^*$
m = NO. OF SAMPLES
$f_c$ = CUTOFF FREQUENCY
FIG. 7

METHOD FOR PROVIDING FEEDBACK CORRECTION FOR AN IMAGING DEVICE

BACKGROUND OF THE INVENTION

This invention relates to a method for assessing the optical quality of an imaging device, and in particular, for providing feedback correction to the imaging device based on this assessment.

INTRODUCTION TO THE INVENTION

Background references for the method of the present invention include:

(1) J. W. Goodman, "Introduction to Fourier Optics", McGraw-Hill Book Company (1968).

(2) W. T. Rhodes and J. W. Goodman, "Interferometric technique for recording and restoring images degraded by unknown aberrations", JOSA, Vol. 63, No. 6, pages 647–657 (June 1973).

(3) G. O. Reynolds, J. B. DeVelis, G. B. Parrent, B. J. Thompson, "The New Physical Optics Notebook", SPIE Optical Engineering Press (1989).

(4) F. D. Russell and J. W. Goodman, "Nonredundant arrays and postdetection processing for aberration compensation in incoherent imaging", JOSA, Vol. 61, No. 2, pages 182–191 (1971).

(5) G. Indebetouw, K. Raj, T-C Poon, "Multiple-pupil interaction for parallel processing in a scanning optical system", Optics Communications, Vol. 79, Nos. 3 and 4, pages 171–175 (1990).

The disclosures of each of the above are incorporated by reference herein.

Attention is first directed to FIGS. 1A-D, which show an optical system 10 and waveforms that may be used to explain the concept of assessing the optical quality of an imaging device.

The FIG. 1A optical system 10 includes a source of radiation comprising a point source 12 that can output a radiation beam 14; and, an imaging device comprising a conventional lens 16. The lens 16 can image the radiation beam to generate an exit pupil imaged beam 18.

In a first case, it may be assumed that the FIG. 1A imaging device comprising the lens 16 is ideal. For this first case, accordingly, the point source 12 can output a radiation beam comprising divergent spherical waves, which divergent spherical waves, in turn, may be imaged by the ideal lens 16 to generate convergent spherical waves.

Since the FIG. 1A lens 16 is assumed to be ideal, it does not introduce wavefront errors, which would otherwise deform the sphericity of the convergent waves. Therefore, a FIG. 1B graph of optical path difference (OPD) error, from assumed perfect sphericity, as a function of exit pupil position (p), is a straight line congruent with the abscissa, i.e., a constant error of zero.

In a second case, it may now be assumed that the imaging device is not ideal. For example, as shown in FIG. 1C, a lens 20 may have inherent defects, such as a trefoil or coma, so that in the presence of the point-source, the lens 20 generates at its exit pupil a wavefront 22 that departs from ideal sphericity. Accordingly, for this second case, a graph of optical path difference (OPD) error, from idealized perfect sphericity, as a function of exit pupil position (p), is of the type illustratively shown in FIG. 1D.

(Note that the FIGS. 1B, D graphs of PD error may be sensed, i.e., generated, by conventional techniques, including Michelson, e.g., Twyman-Green interferometry, or Foucault knife-edge testing.)

SUMMARY OF THE INVENTION

The FIG. 1B, D graphs of OPD error are one measure of the optical quality of the imaging device. The graphs may be generated for the following purpose. Namely, it has been historically understood that:

(1) one may first mathematically interrogate the global OPD error function for its root mean square (RMS), or variance, or standard deviation, or Zernike polynomial curve fit, or peak to valley absolute difference, etc; to an end secondly, (2) of ascertaining the type and the magnitude of an imaging device defect, for the purpose thirdly, (3) of correcting the imaging device defect, for example, by way of a polishing or a surface smoothing technique applied to a surface element of the imaging device.

We have recognized a pervasive and profound problem with this three-step procedure. The problem stems from an inherent assumption, common to all of the cited theoretical mathematical interrogation techniques, which assess the optical quality of the imaging device on the basis of a global parameter, namely, the global OPD error function. Thus, the cited mathematical techniques, for example, the RMS approach, derive a wavefront error statistic from a function that has been initially developed over an entire (hence, global) imaging device exit pupil.

Accordingly, for example, it can be the case that an indefinite number of different OPD error functions can have an identical RMS value, yet, at the same time, have a different impact on imaging performance, so that there may be no direct correlation between minimizing a particular computed RMS value, on the one hand, and providing, on the other hand, a corresponding maximization of global imaging performance through a reduction of local OPD error. Indeed, it can be the case that the imperfect correlation can reduce the imaging performance when the local OPD errors are corrected on the basis of RMS minimization.

Restated, there may be no direct correlation between the global parameter (e.g., RMS) and a feedback instruction to a polisher or optician as to where, locally, on the imaging device, one should directly address or remove a specific, localized defect, based on an informed or prioritized mathematical calculation.

For this reason, lack of direct correlation between, on the one hand, global imaging performance and, on the other hand, informed and prioritized information on local imaging device defects, as derived from the FIG. 1D OPD error function, we have been prompted to investigate a second, independent mathematical approach to assessing the optical quality or imaging performance of an imaging device. This second mathematical approach is based on the classical optical transfer function (OTF) and a related optical quality function (OQF). (See Reference 1).

The optical transfer function is a global spatial frequency-dependent complex quantity, whose modulus is a modulation transfer function (MTF), and whose phase is a phase transfer function (PTF). The MTF is a measure of a reduction in contrast from object to image, for each spatial frequency passed by an imaging device. The PTF represents commensurate relative phase shift, for each spatial frequency passed by an imaging device.

The optical transfer function may be expressed by an equation (1):

$$OTF(freq.) = MTF(freq.) \cdot e^{j \, PTF \, (freq.)} \quad (1)$$

The related global optical quality function (OQF) may be expressed by an equation (2):

$$OQF = \frac{MTF \text{ (actual measurement) (freq)}}{MTF \text{ (diffraction limited) (freq)}} \quad (2)$$
(Perfect Imaging Device)

As a tool for assessing the optical quality of an imaging device, the global OTF and the OQF have the following advantage, as compared to the above elaborated optical path difference (OPD) error technique. Namely, the global OTF and OQF are directly correlated to global imaging performance of an imaging device with arbitrary aberration distributions. Accordingly, the OTF and OQF have an advantage in that they can provide the immediate parameters of concern to customers of imaging devices and systems, since the customers typically state a desired imaging device global imaging performance specification, expressed directly as a function of the OTF and OQF.

The advantage realized by the mathematical approach of the OTF and OQF, may be offset, however, when we point out that these global performance functions do not supply information for a corrective process in terms of required local area modifications. Restated, the OTF and OQF technique, much like the optical path difference (OPD) error criterion, may be limited in usefulness, because there is no way to map these inherently global parameters to performance loss due to discrete parts of an exit pupil.

We have now discovered (first aspect) a novel method for assessing the imaging quality or performance of an optical imaging device. The novel method has an important advantage of retaining all the virtues of the mathematical approach subsumed by the global optical transfer and quality functions, while entirely overcoming their heretofore offsetting limitations, in terms of exclusivity vis-à-vis local mapping capabilities. The novel method has additional advantages, to be specified below, in terms of prioritization capabilities, and performance tailored modulation transfer function (MTF) specifications.

The novel method is suitable for use in an optical system comprising a source of radiation that can output a radiation beam; and, an imaging device to be tested, which imaging device can image the radiation beam to produce an imaged beam. The steps of the novel method comprise:

a) sampling the imaged beam by an opaque mask defining at least two apertures, for generating local wavefront errors at a pupil position defined by a location of the mask; and b) computing a localized optical transfer function (OTF) for the localized wavefront errors transmitted through the sampling apertures.

We have also discovered (second aspect) a novel method for providing correction feedback in an optical system, the optical system comprising:

a source of radiation that can output a radiation beam; and, an imaging device to be corrected and which can image the radiation beam to produce an imaged beam; the steps of the method comprising:

1) sampling the imaged beam by an opaque mask defining at least two apertures, for generating local wavefront errors at a pupil position defined by a location of the mask;

2) computing a localized optical transfer function (LOTF) for the localized wavefront errors transmitted through the sampling apertures, the LOTF being defined by an equation:

$$LOTF(freq.) = LMTF(freq.) \times e^{(j)LPTF \, (freq.)}$$

where
LOTF = Local Optical Transfer Function;
LMTF = Local Modulation Transfer Function;
LPTF = Local Phase Transfer Function;

3) generating from the LOTF a performance map comprising a) a local optical quality factor (LOQF) comprising a ratio $$\frac{\text{the computed } LMTF}{\text{a diffraction limited } LMTF} \; ;$$

and, b) the local phase transfer function (LPTF); and, 4) generating from the performance map correction feedback for applying a controlled action to the imaging device.

BRIEF DESCRIPTION OF THE DRAWING

The invention is illustrated in the accompanying drawings, in which:

FIGS. 1A-1D show an optical system and waveforms that may be used to explain the concept of assessing the optical quality of an imaging device;

FIG. 7 shows a schematic to explain a nexus between local to global performance estimation;

DETAILED DESCRIPTION OF THE INVENTION

Figure 2A:
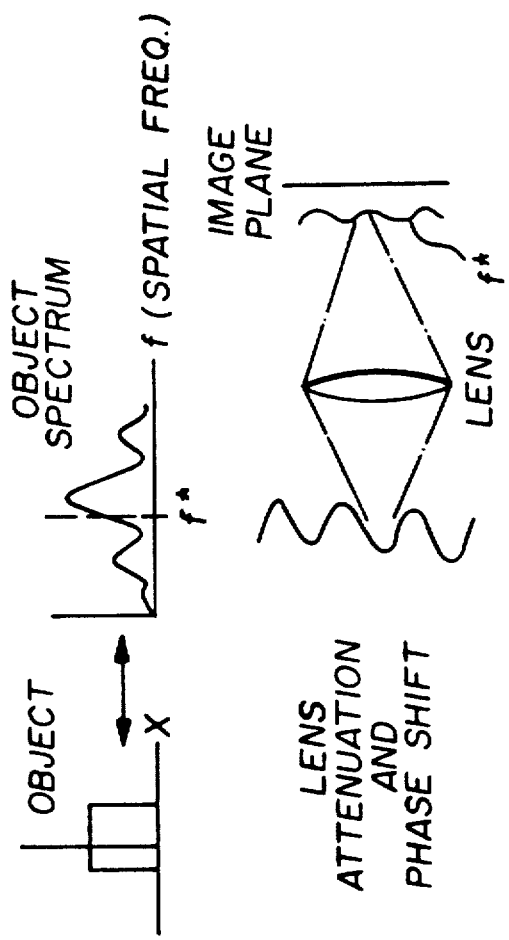
FIGS. 2A and 2B show schematics of a sampling step of the method of the present invention comprising object to image information transfer.

1. The Method Of The Present Invention In Terms of An Assessment Capability

As summarized above, the first aspect of the novel method of the present invention can provide an assessment of the optical quality or performance of an imaging device. This assessment can be done in real time or, alternatively, through software designed to evaluate wavefront error maps from simulated models, or from the output of wavefront sensors.

The imaging device to be tested can comprise a conventional lens, or a mirror, or a diffraction grating, or a combination of these elements. Or, the imaging device can comprise an unconventional element, for example, a synthetic aperture comprising two or more monolithic apertures. The radiation source that inputs to the imaging device can comprise an extended source or a point source, and can be coherent, incoherent, or partially coherent.

The novel method comprises analysis of local wavefront performance, as developed over an exit pupil of an imaging device, as evaluated by the local optical transfer function (OTF). For this reason, the novel method may also be referenced as a Localized Wavefront Performance Analysis (LWPA) system.

In the LWPA system, only the local wavefront errors that are included in LWPA spatial frequency selective sampling apertures, are used in assessing performance of an imaging device. A performance map of a full system aperture my be generated when the apertures are used to sample the wavefront at an adequate number of local areas (i.e., in satisfaction of the classical and well known Nyquist sampling rate function). The wavefront error at each sample position can therefore now be prioritized, and corrected on a basis of its impact on overall imaging performance. Further, any remaining error residuals are now optimized, for minimal impact on imaging device performance.

Restating this last paragraph, but with more particularity, a LWPA system prioritization sequence evaluates an imaging device quality on a basis of a local optical quality function (LOQF) that is specific to discrete regions of an exit pupil defined by an imaging device. This information, in turn, may be used to generate a corresponding LOQF map over the entire exit pupil. An optician or polisher, or adaptive optical control system, can therefore now use this LOQF map, to maximize imaging performance, by correcting those localized wavefront error regions with the lowest local OQF values. The net result of this action of the novel method is to generate a substantially monotonic-type convergence to an acceptable performance, at a given spatial frequency, thus securing a performance tailored local modulation transfer function (LMTF).

The method of the present invention is based on a first principle that an arbitrary object can be constructed from a knowledge of its Fourier spatial components, and on a second principle that a spatial filter, utilizing two dilute apertures, can be used to extract selected spatial frequency information from the object.

The two principles provide an understanding for the first step of the first aspect of the present invention, namely, sampling an imaged beam (generated by an imaging device under test), by way of an opaque screen defining at least two apertures.

The at least two apertures may each comprise a geometric shape defining a rectangle or a star, but preferably comprise a circle or a square. The apertures can comprise areas of appreciable extent, for example, an appreciable percentage of the global exit pupil, or, in a limiting case, may comprise a pinhole dimensionality. (See Reference 3).

Attention is now directed to FIGS. 2 through 7, which are provided as heuristics to demonstrate preferred aspects of the steps of the method of the present invention in its first aspect.

A Lens Sampling Process, Object-To-Image

FIG. 2A symbolically shows an imaging process of the present invention, in terms of the Fourier transform theory, and with a one-dimensional object for an input signal. The two headed arrow indicates a Fourier transformation from the space domain (X) to the frequency domain (f). The spectrum of this FIG. 2A object is schematically shown as the well-known sinc function. A specification frequency (f*) may be selected for performance evaluation in FIG. 2B, where a Young's two-slit aperture is shown sampling the image quality at a pupil position X1. The specification frequency is directly proportional to a distance D between the sample apertures, where $D = \lambda z f^*$, $\lambda$ is the light wavelength, and z the distance between the fringe observation and pupil planes.

This FIG. 2 example indicates how the LWPA apertures extract information on lens quality at critical (specification) spatial frequencies. The transform shown by the double headed arrow is, in general, complex, which indicates that input signal fringe contrast (fringe modulation depth) and phase contribute to the image quality. Local area X1's contribution is shown as the small black rectangle at the LOQF function at frequency f*. Multiple fringe patterns are obtained from the several pupil regions that are sampled. When they are superimposed, the composite fringe obtained from their superposition, is indicative of global performance at frequency f*.

Figure 2B:
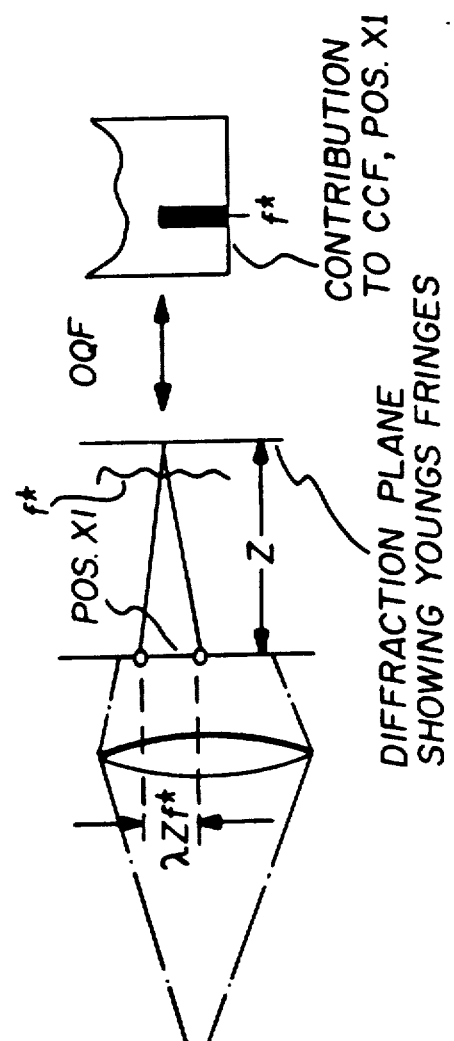

Global performance values over the total lens bandwidth are indicated by the solid line in the LOQF plot of the FIG. 2B, and may be obtained by exploring the pupil with LWPA sample aperture sets having separation distances that cover the bandpass of interest. However, in developing the performance results for a specific spatial frequency, such as f*, only a single fixed LWPA sample aperture separation distance is required. Each sampled position supplies fully redundant (constant separation distance) data in order to obtain a robust estimate of the global performance loss for information transfer at a unique spatial frequency. (cf. this procedure to Reference 4, where the object is the elimination of aberrations.)

(Note that in the LWPA process, it is assumed that a wavefront obtained during testing or performance assessment is supplied as input. In this case, the locally sampled signals are due totally to lens aberrations, and are not confounded by object phase variations. This is, indeed, the desirable condition for our purpose which involves lens performance assessment, and not image restoration, as in Reference 4.)

Local-To-Global Performance Connection

Figures 3A, 3B, 3C:
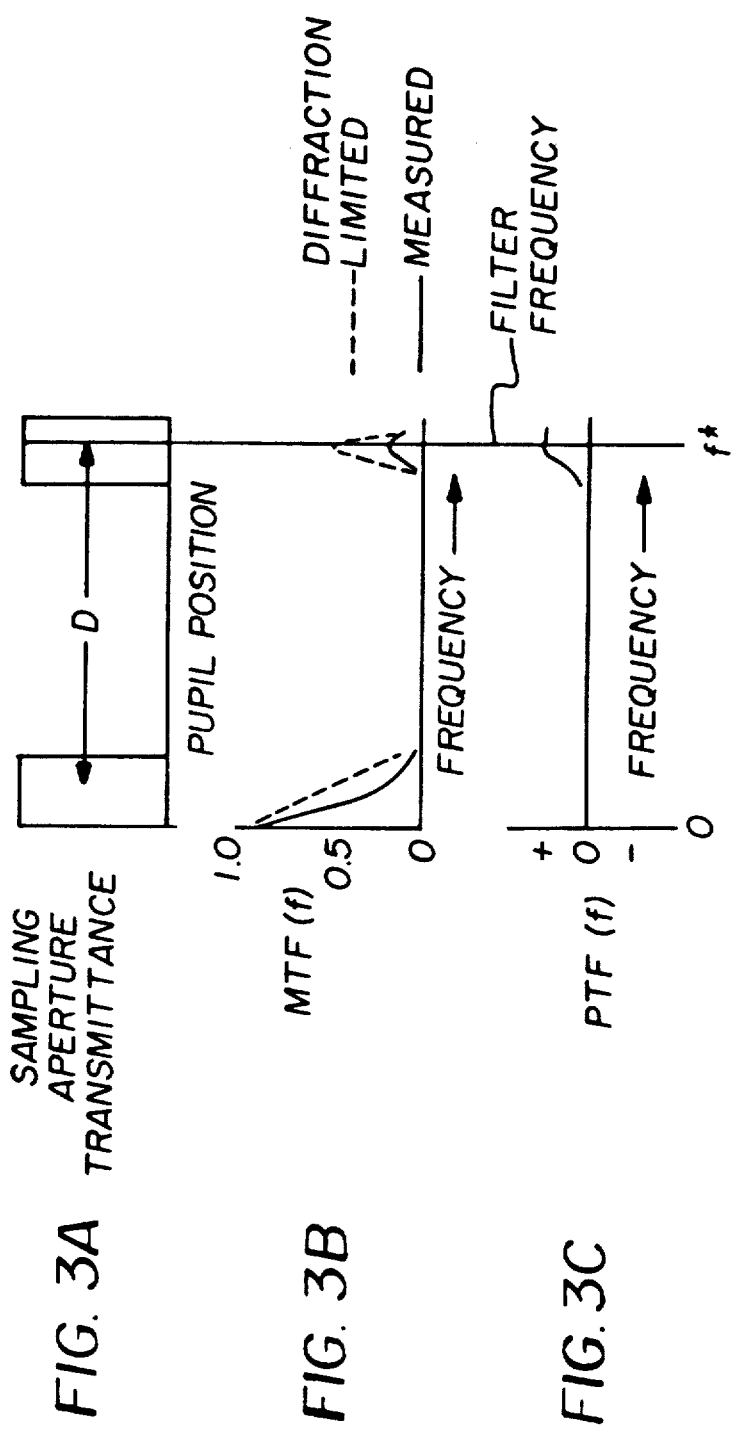
FIGS. 3A-3C show a basic LWPA sampling aperture transmittance function in 1-D form, generated in accordance with the steps of the present invention.

The two-aperture sampling method, discussed earlier, can be considered as comprising a narrow-band filter that extracts from an input wavefront those components that are of maximal importance for object information, transmitted at a specific spatial frequency. The LWPA system combines this operation of frequency selection with the operation of performance assessment. This may be accomplished by obtaining the OTF of the system defined by the two-aperture pupil and the local wavefront errors that are circumscribed therein. FIGS. 3A-C schematically present this critical concept. (Reference 3).

FIG. 3A presents the basic LWPA sampling aperture transmittance function in a one-dimensional form. The distance between the two sample apertures (D) determines the filtered spatial frequency band of interest, in this case denoted f*. The local OTF result may be obtained by the autocorrelation of this complex pupil function, and gives the LMTF (FIG. 3B) and LPTF (FIG. 3C) components.

The dashed LMTF curve represents the diffraction limited case of no aberrations, the solid curve the aberration perturbed case. For a two aperture filter, the diffraction limited LMTF is always 0.5 at frequency f*. Note that the ratio of (LMTF (f*)-perturbed)/(LMTF(f*)-diffraction limited) is roughly 0.50 in the above example. This value represents the LOQF(f*) at the sampled pupil position. A correction at this position can increase the elemental performance at spatial frequency f* by nearly a factor of two.

The local OTF obtained from each sample location gives that region's differential contribution to full aperture imaging performance for an object spatial frequency that is directly related to the separation distance between the two apertures. This concept is schematically shown in FIG. 4.

Full Aperture Performance Synthesis Process

Figure 4:
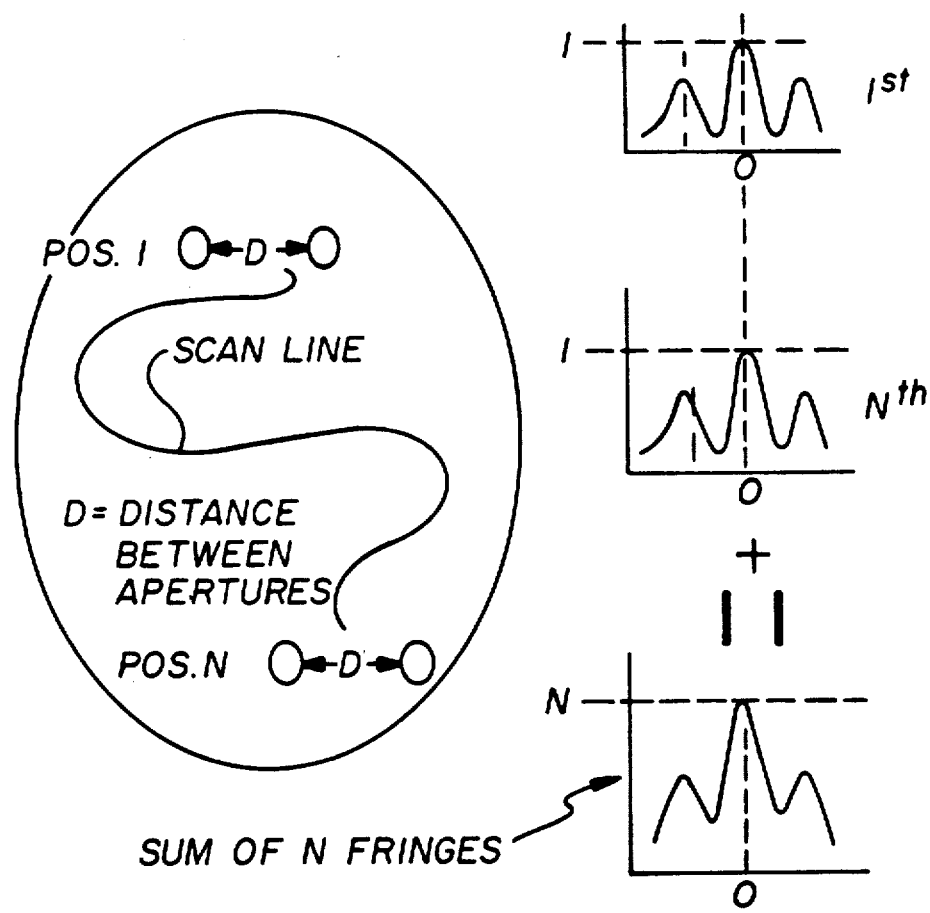
FIG. 4 demonstrates a full aperture performance synthesis process for a unique spatial frequency.

As shown in FIG. 4, the two apertures, separated by a distance D, give Young's fringes at the diffraction plane, for each sample position (1 through N). Local image quality loss is indicated by fringe contrast degradation (LMTF) due to local aberrations, or from phasing (LPTF) errors as indicated by translation of a main lobe from a reference position (zero (0) in figures). Such local aberrations can tend to reduce the composite fringe generated from the superposition of the N sample patterns of unit normalized amplitude. The resulting composite fringe is indicative of global quality.

In summary, the FIG. 4 represents a schematic version of the situation for a perfect full aperture optic. In this case, the fringes from the N sample areas will have maximal amplitudes and be perfectly phased (exact alignment of all central lobes). This will result in a composite unattenuated fringe of maximal contrast of N. A key point in this development is that each pattern can be evaluated separately for its affect on full aperture performance. In essence, the Young's fringes form a linear system which allows superposition—the total effect due to the N local fringes is given by their superposition. This yields the desired connection between the local and full aperture performance.

LWPA uses a somewhat modified form of Young's interferometer, in that the sample apertures may be of appreciable extent. This expands the sensitivity of the system to any higher-order (2nd degree or higher) aberrations that are contained in the sample region, because they are nonlinear in nature, and thus have a strong impact on the local fringe pattern quality and resulting local OQF.

A Fourier transform of the sample pupil gives the above fringe pattern in the far-field plane. A second transform gives the local OQF, the primary output. In the results presented herein, the local OQF values are computed directly from the autocorrelation of the wavefront errors circumscribed in the two sampling apertures.

In summary, the LWPA concept can be connected with the Young's aperture sampling of a wavefront and its transfer to the diffraction (image) plane. A direct sampling by two dilute apertures, separated by appropriate distances, gives the information necessary to obtain a local image quality in terms of critical specification frequencies. The performance at different pupil regions can be obtained with a generalized "Young's interferometer" sampling process, in that finite area sampling apertures are used. An additional generalization may entail the use of more than two apertures, in order to obtain results pertinent to several spatial frequencies simultaneously (multi-band spatial frequency filtering). (See Reference 5).

Experimental Data

Figure 5A:
FIGS. 5A and 5B show a (shaded) wavefront error contour map and corresponding profile, respectively, generated in accordance with experimental data.
Figure 5B:
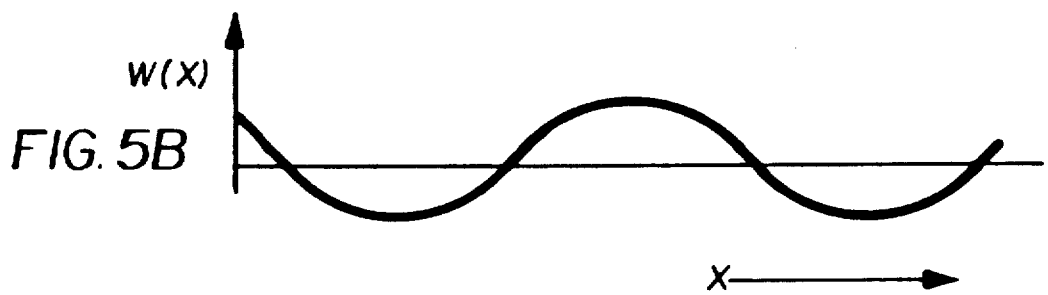

In order to test the LWPA concept, a wave front affected with 1/10 wave (peak-to-valley) of spherical aberration was evaluated. The data consisted of a single strip through the wavefront error map which comprised approximately 10% of the full aperture. A contour (shaded) wavefront error map is presented in FIGS. 5A, B. The wavefront error contour map is shown in FIG. 5A, and the corresponding profile in FIG. 5B.

The local performance contribution for the example aberration (pure Zernike spherical) is well known and thus allows assessment of LWPA accuracy. A strip format was selected for ease of presentation, but the results are directly extendable to the complete pupil.

Figure 6:
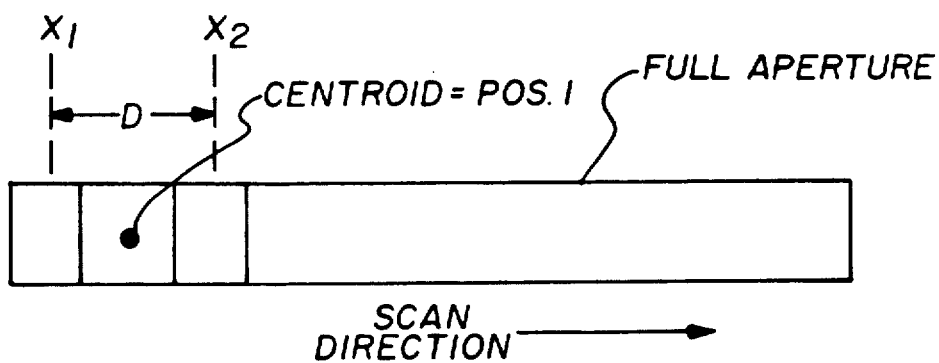
FIG. 6 shows a schematic of an illustrative LWPA sampling geometry.

The corresponding LWPA sampling geometry is schematically shown in FIG. 6.

Specific sampling parameters are as follows:

1) Rectangular sample area (both apertures): about 10% of input aperture area.

2) Sample aperture separation distance D is about 14% of input aperture width—commensurate with 10 c/mm information.

3) Filter shift distance (sample spacing every 4 data points)—about 8% of input aperture diameter.

The above parameters resulted in a LWPA consisting of 13 uniformally spaced samples that spanned the pupil region. Since each sample consisted of two dilute sample apertures, the total data base comprised 26 local regions. The performance map of Table I gives test-case results in terms of OQF versus aperture position.

TABLE I

| | Performance Map (10 c/mm) | | |
|---|---|---|---|
| POS | LMTF(10) | LPTF(10) | LOQF(10) |
| 1 | 0.4883 | +15.5 | 0.9766 |
| 2 | 0.4959 | −4.8 | 0.9918 |
| 3 | 0.4992 | −15.4 | 0.9984 |
| 4 | 0.5000 | −18.3 | 1.000 |
| 5 | 0.4995 | −15.4 | 0.9990 |
| 6 | 0.4988 | −8.7 | 0.9976 |

TABLE I-continued

Performance Map (10 c/mm)

| POS | LMTF(10) | LPTF(10) | LOQF(10) |
|---|---|---|---|
| 7 | 0.4985 | 0.0 | 0.9970 |
| 8 | 0.4988 | +8.7 | 0.9976 |
| 9 | 0.4995 | +15.5 | 0.9990 |
| 10 | 0.5000 | +18.3 | 1.000 |
| 11 | 0.4992 | +15.4 | 0.9984 |
| 12 | 0.4959 | +4.8 | 0.9918 |
| 13 | 0.4883 | −15.5 | 0.9766 |

The Table I values are ordered in the form of a 10 c/mm imaging performance map (OQF). The results are shown at 13 equally spaced points over this aperture. Table I parameters include:

POS: the position of the local error in the aperture-position is along the X-direction; left-to-right with position 1 leftmost (see FIG. 6);

LMTF(10): local MTF at 10 c/mm;

LPTF(10): local phase error at 10 c/mm in 10 degrees;

LOQF(10): local optical quality factor at 10 c/mm-ratio of LMTF(10) to the corresponding diffraction limited LMTF.

This result shows that wavefront errors at positions 1 and 13 had the greatest impact on performance (lowest LOQF), while 4 and 10 had the least (highest LOQF). Since local positions 1 and 13 had the lowest LOQF values, they would be modified first with the expectation that their correction results in the maximal global OQF improvement at 10 c/mm. Simulated correction was accomplished for these maximally high loss positions in addition to those at 2 and 12 and 4 and 10. Correction of errors at 2 and 12 effected the second greatest improvement because they generated the second lowest LOQF, whereas correction at 4 and 10 did not contribute to improvement, in that their LOQF was already at a peak limiting value of 1.000. After each correction, the global OQF was recomputed. Corrected results and calculated improvement ratios are shown in a Table II.

TABLE II

Results at Three Position Sets (10 c/mm) (Input MTF 0.8405)

| | Positions Corrected: | | |
|---|---|---|---|
| | 1 & 13 | 2 & 12 | 4 & 10 |
| MTF-after corr: | 0.8584 | 0.8429 | 0.8394 |
| Improve. Ratio: | 1.022 | 1.015 | 1.000 |

As seen, the LWPA dictated corrections in regions 1 & 13 gave the greatest improvement, 2 & 12 the next greatest improvement, and, 4 & 10 little or no improvement. These results are in complete agreement with the prioritization indicated by the Table I LWPA performance map. The maximal 2+% gained with the correction of errors in positions 1 and 13 may represent a significant improvement for 10 c/mm information transfer. On this basis, the example case has demonstrated a localized performance directed optimization for full aperture OQF.

It is important to assess the effect of the above LWPA dictated correction on other frequencies in order to determine impact on lens wideband performance. A qualitative assessment is presented in Table III.

TABLE III

Filter Results vs. Fequency (10 c/mm)

| Frequency c/mm | D1MTF | D2MTF | %-IMP |
|---|---|---|---|
| 10 | 0.0318 | 0.0179 | 56.3 |
| 20 | 0.0563 | 0.0088 | 15.6 |
| 30 | 0.0548 | 0.0263 | 47.9 |

D1MTF: The difference between the diffraction limited MTF and the perturbed input MTF.

D2MTF: The difference between the corrected and input MTF.

%-IMP: The percent improvement calculated as the ratio D2MTF/D1MTF.

The table indicates the performance improvement for a band of spatial frequencies given LWPA dictated correction at positions 1 and 13, regions contributing maximal performance loss for 10 c/mm information transfer.

The 56.3% improvement in the 10 c/mm global OQF is as expected. The interesting aspect of the data concerns a non-uniform enhancement associated with the data at frequencies of 20 and 30 c/mm. The fact that 20 and 30 c/mm performance is also enhanced is not unexpected, given the high spatial correlation associated with the input aberration function. However, the relative differential in the size of the improvements (47.9%-vs-15.6%) suggests that performance improvement at collateral frequencies will not be uniform. The non-randomness of arbitrary aberrations, particularly the highly deterministic form for the example test case, supports the differential shown in the Table III data.

Local to Global Performance Estimation

This section considers the connection between local and global performance in greater detail. It would be highly desirable to show that there is more than a correlation between local and global performance. The following results will show, that with appropriately spaced samples, the average vector sum (AVS) of the local complex OQF values gives a good approximation to the global result. This concept is shown schematically in a FIG. 7.

Note that the global OQF is the average vector sum (AVS) of the local OQF values; arrow denotes vector in diagram. This formula ties the full aperture performance, denoted the global OQF, to the local OQF values represented by the m OQF(f*)'s under the summation symbol. In this model, the OQF is a complex number (treated in vector form) which is comprised of modulus and phase parts that are indicative of performance. Thus, the global OQF at a given spatial frequency is the phasor or vector average of the m local OQF values. A mathematical derivation of this result is given in Appendix A. Table IV presents the AVS calculation data for the Table II performance map.

TABLE IV

LWPA VECTOR SUM ESTIMATE OF GLOBAL OQF

| POS. | PTF(10) | OQF(10) | C(PTF) | S(PTF) | OQF × C(PTF) |
|---|---|---|---|---|---|
| 1 | +15.5 | 0.9766 | 0.9636 | 0.2672 | 0.9413 |
| 2 | −4.8 | 0.9918 | 0.9965 | −0.0837 | 0.9883 |
| 3 | −15.4 | 0.9984 | 0.9641 | −0.2656 | 0.9626 |
| 4 | −18.3 | 1.000 | 0.9494 | −0.314 | 0.9494 |
| 5 | −15.4 | 0.9990 | 0.9641 | −0.2656 | 0.9631 |
| 6 | −8.7 | 0.9976 | 0.9885 | −0.1513 | 0.9861 |
| 7 | 0.0 | 0.9970 | 1.0000 | 0.0000 | 0.9970 |
| 8 | +8.7 | 0.9976 | 0.9885 | 0.1513 | 0.9861 |

TABLE IV-continued

| | LWPA VECTOR SUM ESTIMATE OF GLOBAL OQF | | | | |
|---|---|---|---|---|---|
| POS. | PTF(10) | OQF(10) | C(PTF) | S(PTF) | OQF × C(PTF) |
| 9 | +15.5 | 0.9990 | 0.9641 | 0.2656 | 0.9631 |
| 10 | +18.3 | 1.000 | 0.9494 | 0.3140 | 0.9494 |
| 11 | +15.4 | 0.9984 | 0.9641 | 0.2656 | 0.9626 |
| 12 | +4.8 | 0.9918 | 0.9965 | 0.0837 | 0.9883 |
| 13 | −15.5 | 0.9766 | 0.9636 | −0.2672 | 0.9413 |
| | | | Vector Sum: 12.5786 | | |

Table IV entries present the vector summation components for each position in the aperture with the following nomenclature:

POS: aperture position;

PTF(10): local phase error at 10 c/mm in degrees;

OQF(10): local optical quality factor at 10 c/mm-ratio for MTF(10) to its corresponding diffraction limited MTF;

C(PTF) = Cosine of PTF, local cosine vector component;

S(PTF) = Sine of PTF, local sine vector component;

OQF X C(PTF) = the product of the local OQF and the cosine of the PTF.

This represents the cosine component contribution of the local region to the global OQF.

The C(PTF) and the S(PTF) are the vector cosine and sine components (real and imaginary axis projections) associated with the local OQF's. According to the math model shown in FIG. 4 and derived in Appendix A, the AVS of the OQf's is a good estimator of the corresponding global result. In algebraic summation of the sine and cosine vector local OQF components gives corresponding global components. The global OQF is then computed at the Root-Sum-Square (RSS) of the two sums. Note that since the tabular results are for an optic with spherical aberration, a symmetrical or even function, the S(PTF) factors sum to zero and it is not necessary to compute OQF X S(PTF). However, the OQF X C(PTF) summation total is 12.5786 and the estimated global OQF is calculated directly as 12.5786/13 or 0.9676. This compares with a conventional global result of 0.9635 as computed from the autocorrelation of the full aperture complex pupil function—well within our computational accuracy.

The above example highlights the strength of the localized approach in maximizing the rate of convergence to acceptable performance. We note that the performance map of Table I is a satisfactory indicator of the performance contribution from local pupil regions in that results are in agreement with the local wavefront error contributions expected from the test case deterministic aberration. For example, the maximum error slope differential for the input spherical aberration is located in the regions associated with positions 1 and 13 for 10 c/mm information transfer—maximàl loss would be expected in these regions. For example, the maximal slope error correlates with the maximum transverse ray error at the image plane.

A good counter-example is afforded by the minimal loss indicated for errors at positions 4 and 10 (LOQF of 1.0). This result is mathematically supported by the fact that the second derivative of the wavefront error for 10 c/mm information, as characterized by the differential of the PTF(10) function, is approximately zero at these positions. The presence of an inflection point suggests that error modification will be relatively ineffective as a means of increasing imaging performance at the evaluation frequency. It should be noted, however, that the parts of the pupil circumscribed by the 4 and 10 samples may have significant impact on information transfer for different specification spatial frequencies.

II. The Method Of The Present Invention In Terms Of A Controlled Feedback Capability The first aspect of the present invention, namely, its capability for providing a localized imaging quality assessment of an imaging device, has now been disclosed, and we accordingly turn our attention to particulars of the second aspect of the present invention. Here, as summarized above, we desire to exploit the first aspect's assessment capabilities, to an end of generating correction feedback, developed from this assessment, for applying a controlled feedback action to the imaging device.

Figure 8:
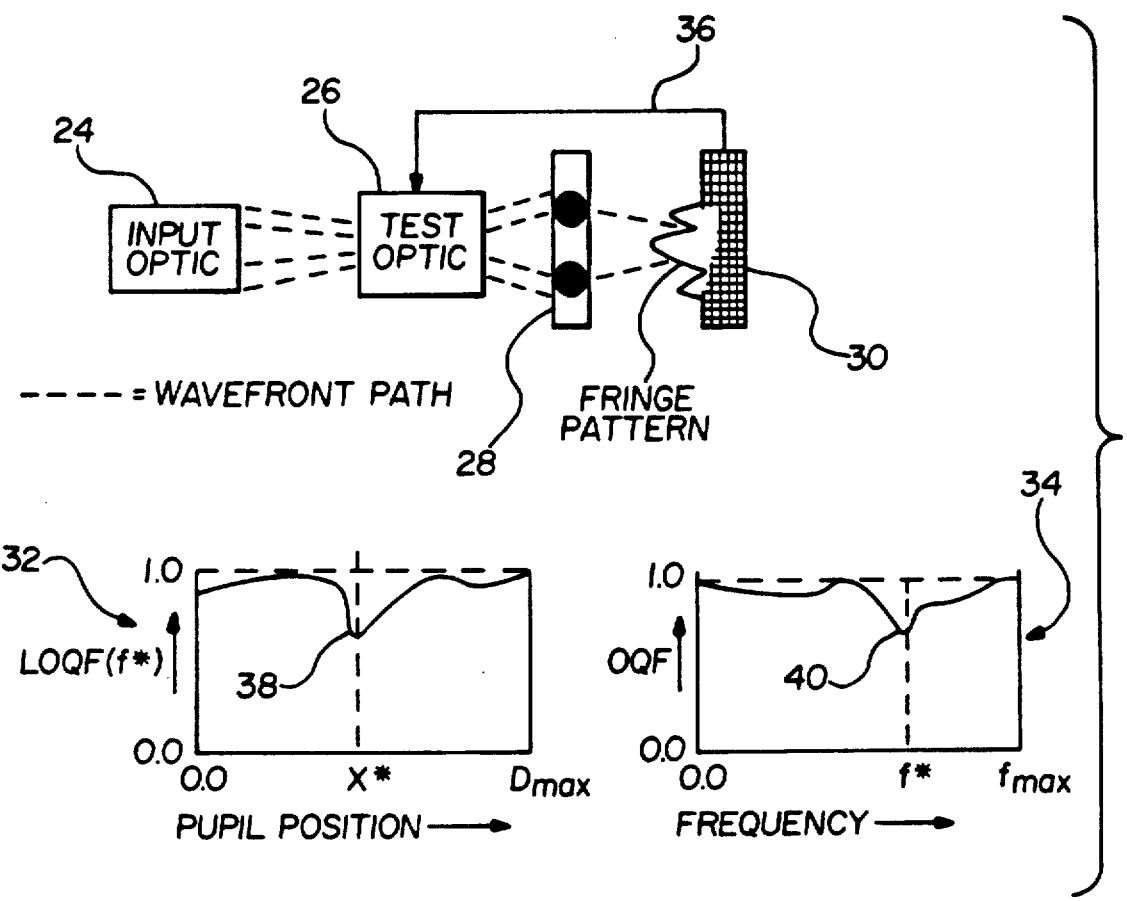
FIG. 8 is a generic illustration of an optical assembly comprising correction feedback developed in accordance with a method of the present invention.

In general, a "controlled action" to the imaging device may be realized in accordance with a generic FIG. 8 construct, wherein:

Numeral 24 = input optic (input wavefront conditioning such as autocollimation, null compensation, etc.);

26 = imaging device or optic undergoing LWPA evaluation;

28 = LWPA filter, shown as a spatial light modulator (SLM);

30 = LWPA signal detector, read-out and evaluation; vs pupil position-x;

34 = global OQF, computed for full pupil;

36 = correction feedback or controlled action;

and where $D_{max}$ is the maximum extent of the pupil, and $f_{max}$ is a test optic cut-off frequency.

The FIG. 8 construct is generic, since it comprises a feedback correction capability for an operational adaptive optical system, or a low volume manufacturing control system, or a high volume manufacturing control system. Particulars on all three systems are disclosed, below.

For all three cases, the LWPA system can generate a performance map, directly, with hardware (such as the noted SLM), or by computation from the recorded wavefront errors. This gives LOQF vs pupil position for spatial frequency f*, as shown at FIG. 8 inset 38. Those regions with the lowest LOQF are the worst imaging degraders, shown at pupil position X* of this figure inset. Verification may be seen in the conventional global OQF, at FIG. 8 inset 40. As indicated, the greatest global improvement can indeed be effected for frequency f*, via correction of the pupil error at position X*.

Correction information may be obtained from the LPTF part of the LOQF, which indicates the differential error between the region of the wavefront error circumscribed by the sampling apertures.

1. Particulars on LWPA Application To Adaptive Optics

Figure 9:
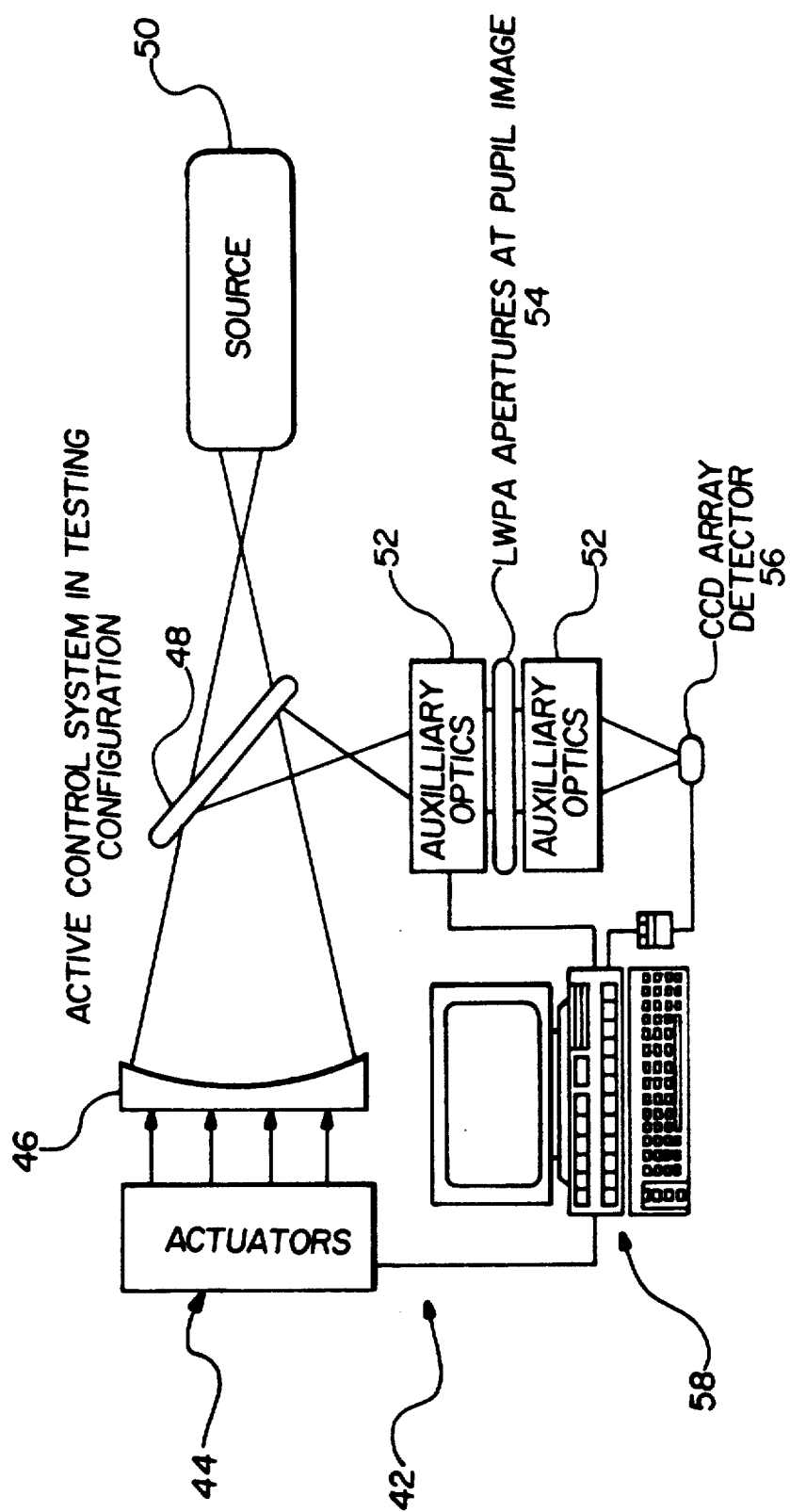
FIG. 9 shows a first species of the FIG. 8 generic correction feedback assembly comprising an active control system.

Attention is now directed to FIG. 9, which shows a first species of the FIG. 8 generic correction feedback construct, comprising an active control system 42. In particular, the active control system 42 includes conventional components connected as shown:

force or displacement actuators 44;
test optic 46;
beamsplitter 48;
light source 50;
auxiliary optics 52;
spatial light monitor 54;

CCD array 56; and
computer 58.

With respect to the FIG. 9 active control system 48, note that the image quality of the test optic 42 can be directly improved on the basis of local performance assessment. For example, the number of force and/or displacement actuators 44 can, via the method of the present invention, be optimally determined, and optimally positioned, within the active pupil element. This leads to greater efficiency in a correction process, since it derives from local, rather than global, performance parameters.

Note, furthermore, that in operation, the force actuators 44 can apply a required or determined force to the test optic 46, as computed by the computer 58. To this end, the computer 58 may be conventionally programmed to develop, in accordance with input parameters from the performance map, an influence function, of the type disclosed, for example, in U.S. Pat. Nos. 4,875,765 and 4,993,823, and incorporated by reference herein.

Figure 10:
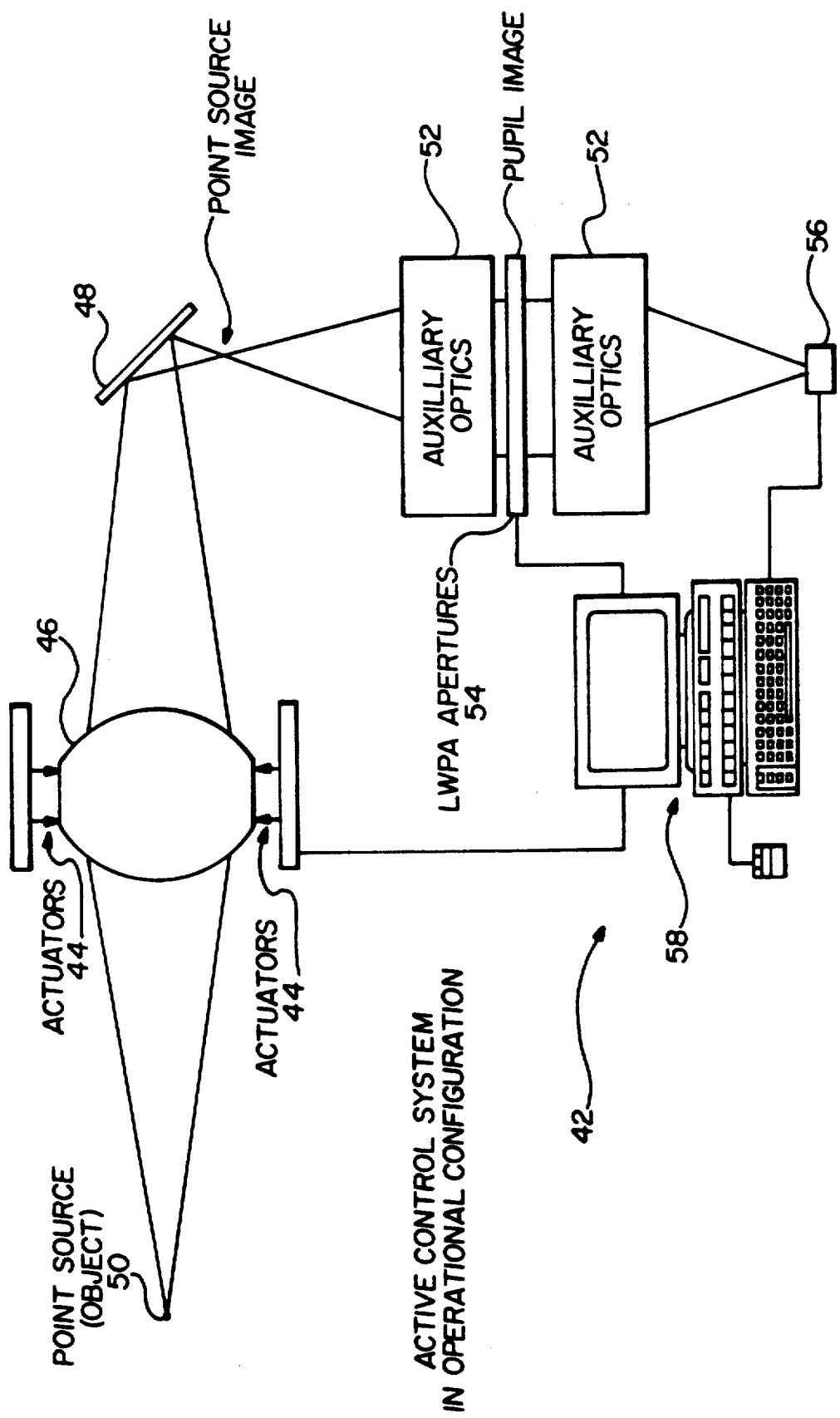
FIG. 10 shows a second species of the FIG. 9 correction feedback assembly comprising an active control system in operative configuration.

Attention is now directed to FIG. 10, which shows a second species of the FIG. 9 active control system 42. Here, the components are the same as those listed for the FIG. 9 system 42, but they are now slightly re-structured so that the method of the present invention can be used in a wavefront sensor configuration. In particular, note that the point source (object) 50 is now located on the other side of the spatial light monitor 54.

In the FIG. 10 operation, the pupil is imaged by the auxiliary optics 52 onto the spatial light modulator 54. The spatial light modulator 54 may be programmed to step through a series of pupil position locations by scanning the sample apertures over the imaged pupil, as schematically shown in FIG. 4. The light is re-imaged onto the CCD detector 56, which is conjugate to the original image surface. The signal from the detector is Fourier transformed to give the LMTF, from which the LOQF is calculated. This results in a performance map of LOQF versus pupil position, which the computer 58 uses to determine the local corrections necessary to maintain acceptable imaging quality. This is done using a conventional optimization algorithm. The system can then evaluate the effects of the changes in real-time to insure that the image quality is maintained.

Note that the LWPA method can also be used to tailor the response of an adaptive system to user needs. For example, if it is required that the system performance be optimized at specific frequencies (typical of most performance specifications), LWPA can be used to determine those local features which will give the most efficient convergence to acceptable imaging quality. (In contrast, conventional methodology involves minimizing the RMS of the wavefront error—a function of the total frequency bandpass of the lens.)

LWPA and Manufacturing Control Introduction

Figure 11:
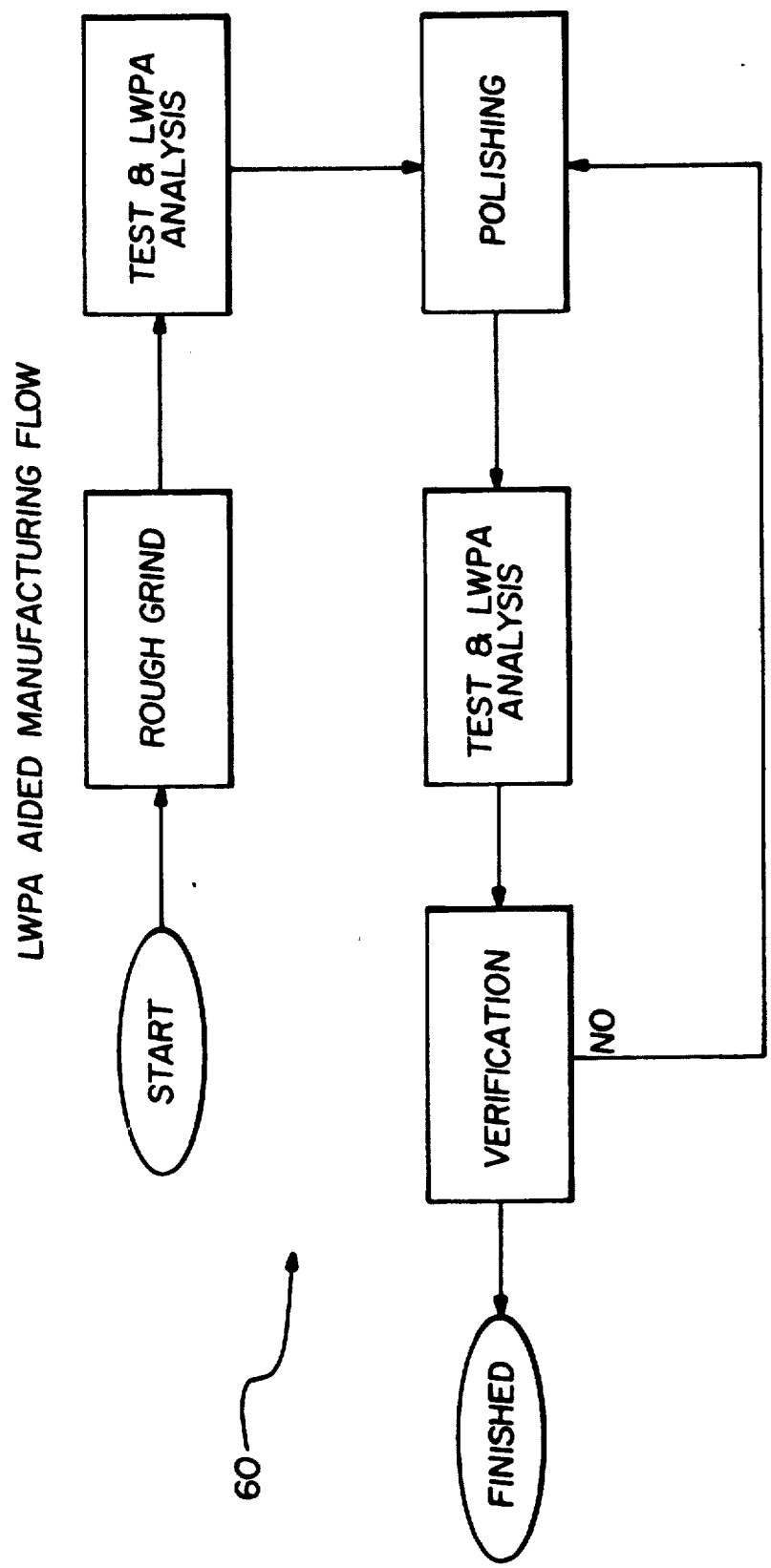
FIG. 11 comprises a low volume manufacturing control flowchart utilizing a method of the present invention.

High volume process control involves an entire manufacturing process (see FIG. 14), which entails a rapid sequential production of optical components and systems. In this process, individual components and systems are not reworked until they meet specification. This is in contrast to low volume production (see FIG. 11) where components and systems are processed until they meet specification.

2. Particulars On LWPA And Low Volume Manufacturing Control

In the same way that LWPA can be used to determine localized optical performance and prioritize a correction sequence for an active system, it can be used in the manufacturing of optical components. In this case, the corrections may be provided by polishing or figuring tools that can reduce "high spots" on an optical surface. (Currently, in contrast, an optical component is polished until it reaches a specified RMS wavefront error.)

LWPA provides the basis for an intelligent manufacturing system dedicated to the production of optical components. The result is a method 60 (see FIG. 11) where raw materials are input and finished products are output. In essence, this removes the art from the fabrication of optical components, and leads to an improved competitiveness in today's markets.

An automated procedure typically starts with a set of LWPA compatible requirements on the components to be manufactured. The raw materials (optical blanks) may be input into the process where they may be first rough ground to an appropriate figure. Once the figure is ground, the component may be tested, and performance maps may be generated, using LWPA at specific frequencies. Each of the frequency based performance maps may be properly weighted and summed, to give a composite map that may be used to correct those local regions which yield the greatest improvement in imaging quality.

Figure 12:
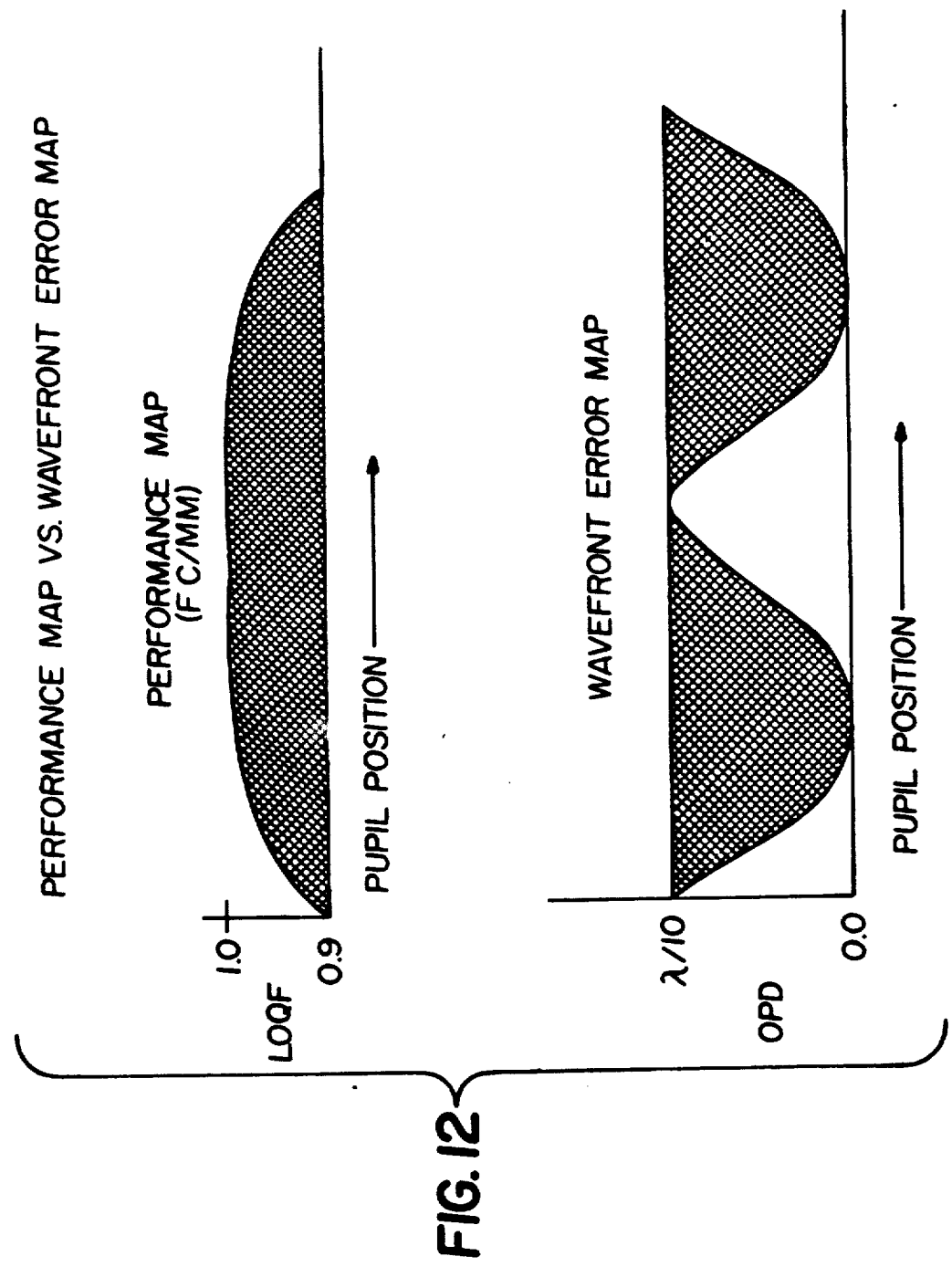
FIG. 12 shows a performance map vs. wavefront error map, derived from an example of the FIG. 11 flowchart process.

FIG. 12 shows the potentially large differences between performance and wavefront error. In this example, the performance map shows that the errors in the pupil center are not significant with respect to the imaging performance at the spatial frequency, f*. In contrast, the wavefront error map dictates a need for correction in this region. If the optic were processed according to this criteria, resources would be wasted.

Figure 13:
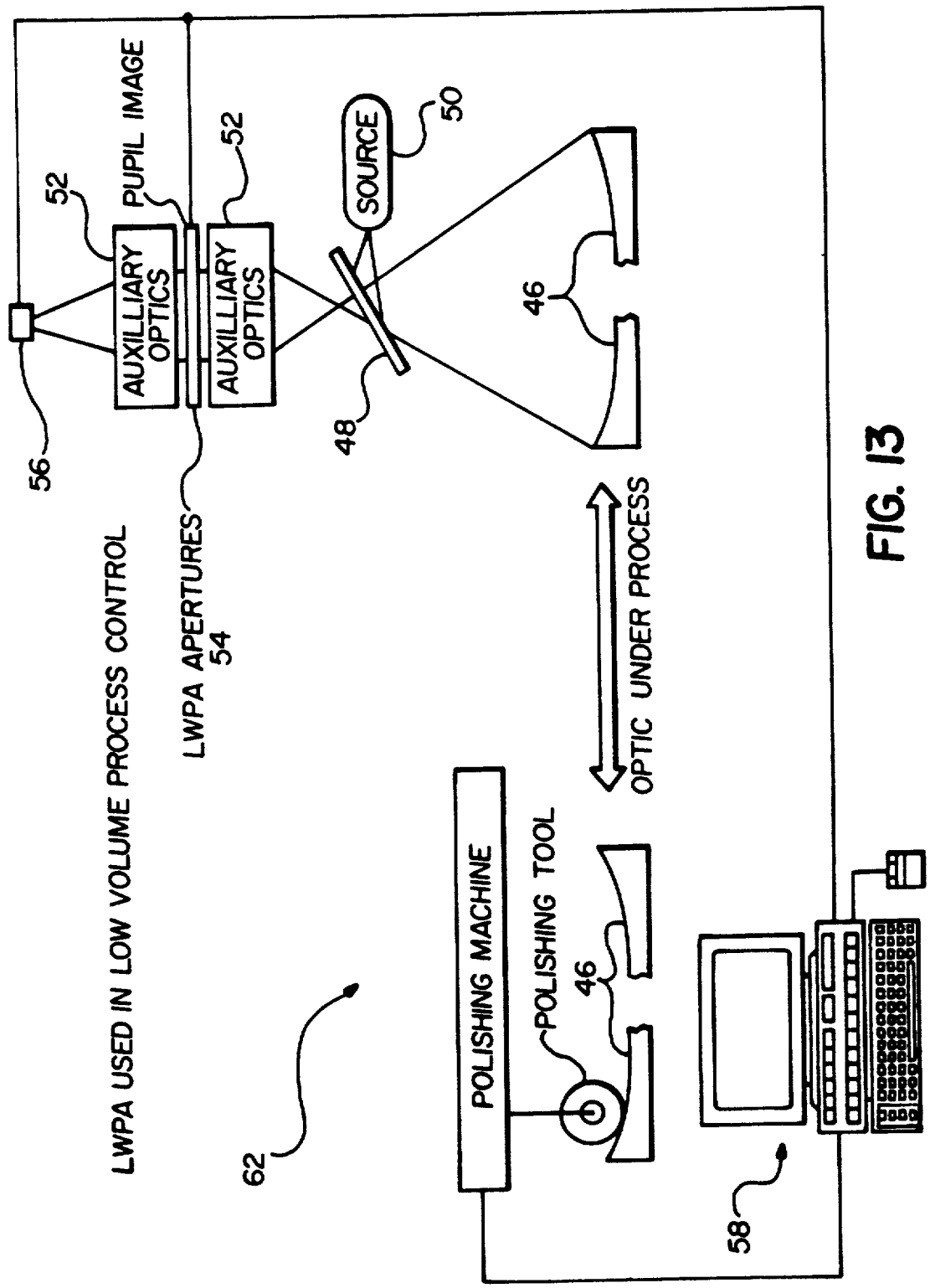
FIG. 13 shows a hardware realization of the FIG. 11 flowchart.

FIG. 13 provides an example of a polishing process 62 using LWPA. An optical component may be polished based on inputs from the process control computer. It may be then tested and the results evaluated using LWPA. The process control computer uses the lowest LOQF values to determine the local areas where correction will give the largest improvement in performance. The component may be returned to testing, where another wavefront error map may be generated, and a LWPA analysis performed.

In theory, if the testing were sufficiently accurate, the component would be completed with one processing cycle. Uncertainties and errors in the testing procedure may preclude this possibility; however, even with testing errors, the number of cycles will be reduced.

In summary, the success of this procedure depends on the ability of LWPA to correct only those features which may affect user imaging performance requirements. This results in a system which is tailored to the customers performance requirements, in that the optics bandpass has been optimized. Because of the normally high correlation in the manufacturing process, collateral (non-specification) frequencies will in general improve, but not at the same rate as the prioritized critical one(s).

3. Particulars On LWPA And High Volume Manufacturing Control

Figure 14:
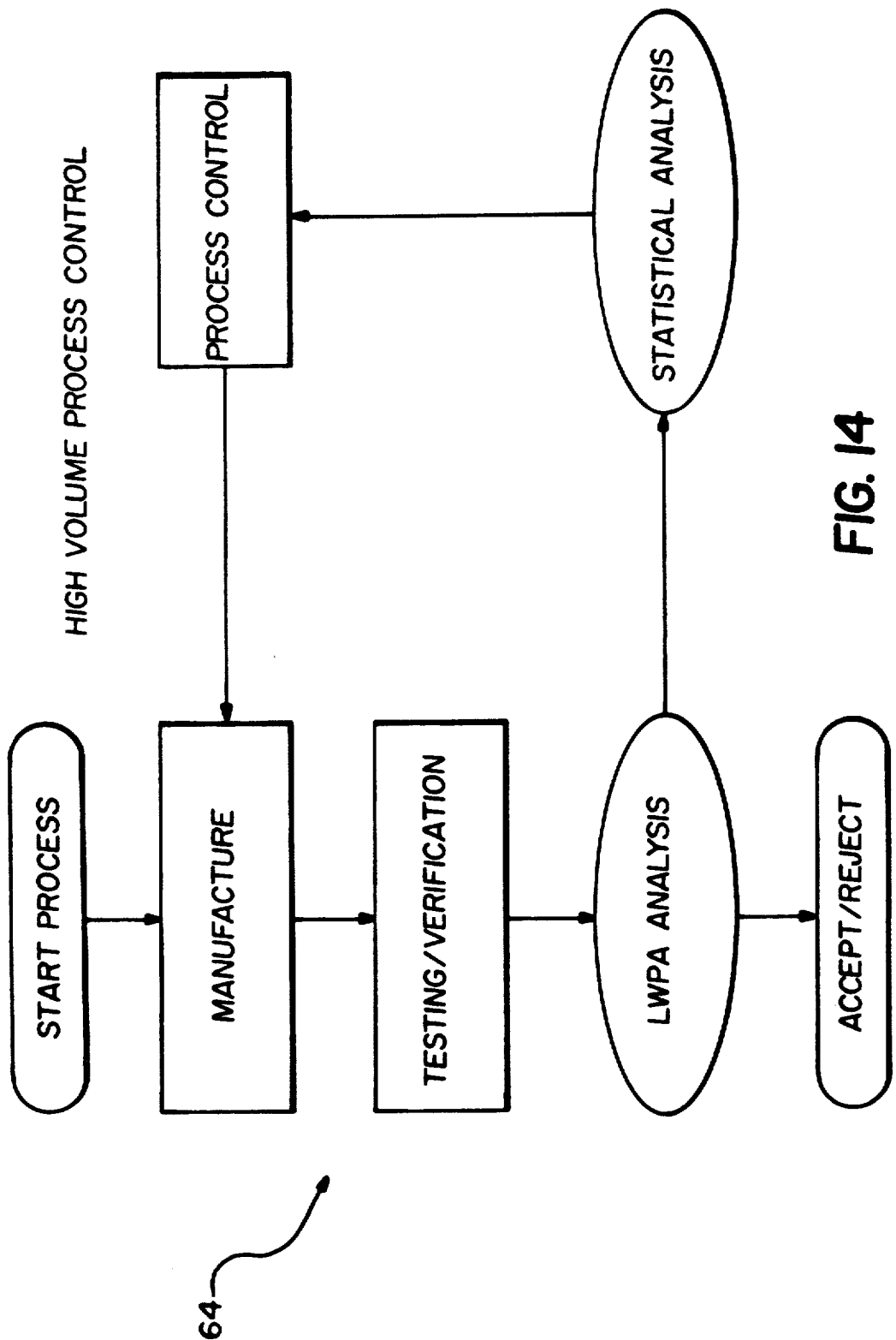
FIG. 14 comprises a high volume manufacturing control flowchart utilizing a method of the present invention.

The LWPA system can also monitor and control the high volume manufacture of precision optical components and systems, and is shown schematically in a FIG. 14 high volume process control flowchart 64.

Figure 15:
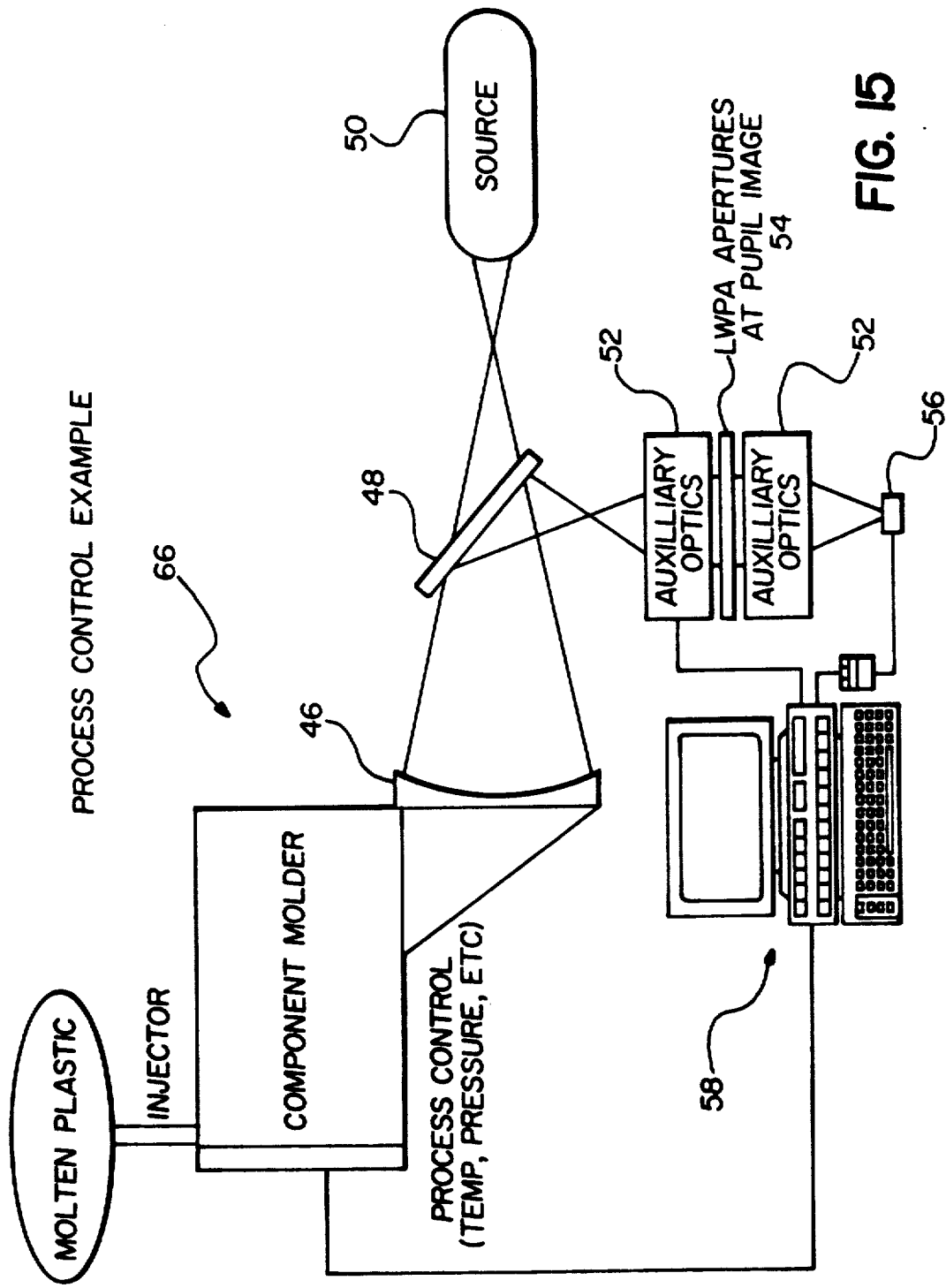
FIG. 15 shows a hardware realization of the FIG. 14 flowchart.
Figure 16:
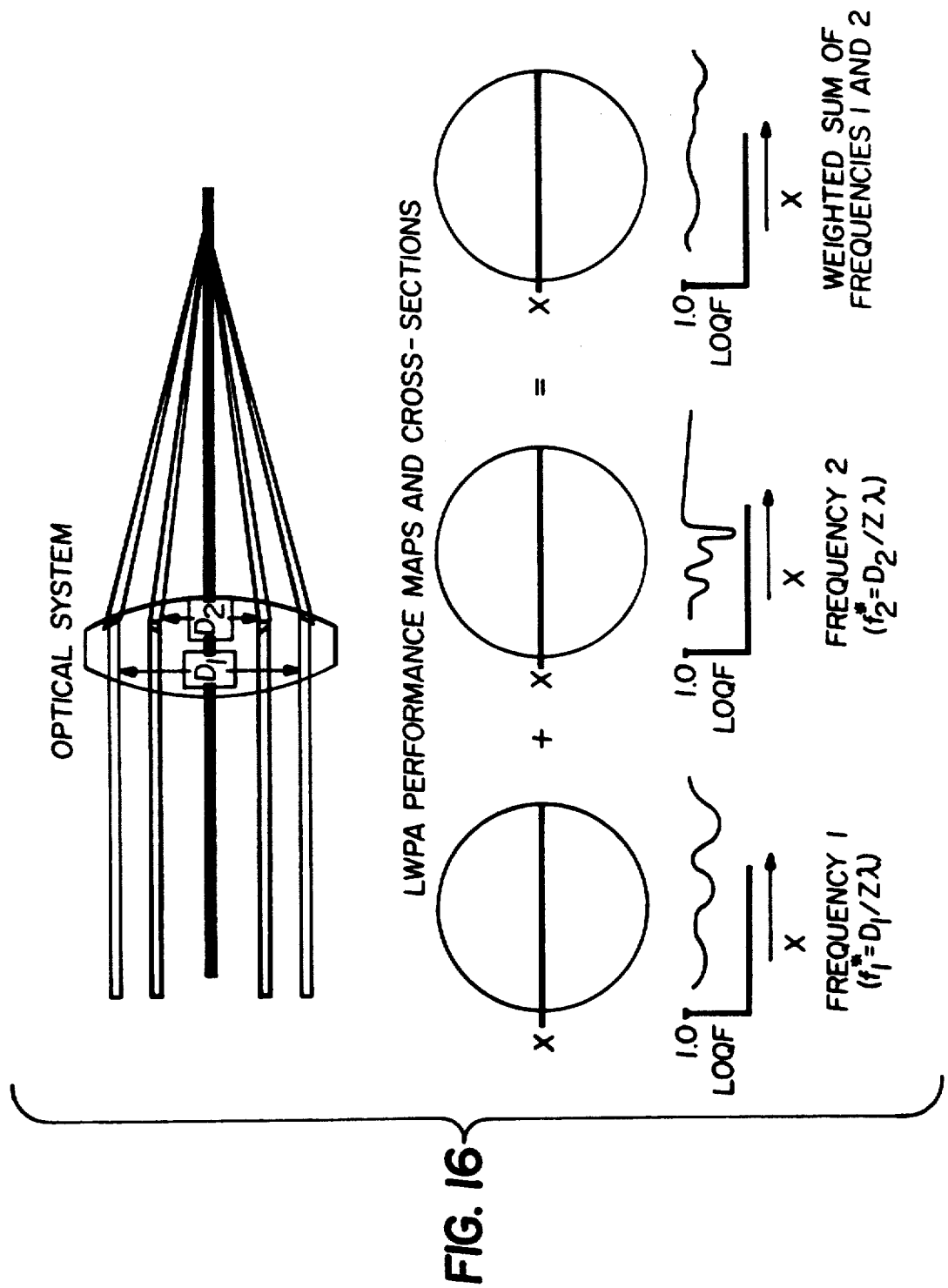
FIG. 16 shows performance maps derived in accordance with the FIG. 15 hardware system.

FIG. 15 shows an example of the FIG. 14 flowchart process, using a standard high volume manufacturing process 66 such as injection molding. As the components and/or systems are manufactured, they may be tested and evaluated at specific frequencies using LWPA. The results may be combined to form performance maps as shown in FIG. 16.

If the component or system meets specifications, per global OQF, as calculated using the average vector sum (AVS), and cumulative probability distribution function (CPDF) of the LOQF's, it is accepted.

---

APPENDIX A
AVERAGE VECTOR SUM DERIVATION

In this section we derive a mathematical relationship between the local and global or full aperture performance. The derived model will show that the global OQF can be expressed as the average of the vector (phasor) sum of the local OQF's. In the following demonstration, it is assumed that the sampling density of the pupil plane satisfies the Nyquist criterion relative to the aberration spatial frequency bandwidth.

The OTF can be computed as the autocorrelation of the lens complex pupil function; P(x) as- $$OTF(f) = \frac{1}{A} \int_S P(x)P^*(x + D)dx \qquad (1)$$

Where-
A = total area of full aperture
s = common region of integration for the product $P(x) P(x + D)$
$P^*(x + D)$ = complex conjugate of pupil function for shift distance $D = \lambda z f$
$\lambda$ = lightwavelength
z = distance of pupil to diffraction plane
D = pupil shift distance
f = spatial frequency
$P(x) = p(x)e^{jkW(x)}$ and $P^*(x + D) = p(x + D)e^{-jkW(x+D)}$
where-
p(x) = complex transmittance of pupil
W(x) = aberration function of pupil and $k = 2\pi/\lambda$.

Thus, eq. (1) is expressed as- $$OTF(f) = \frac{1}{A} \int_S p(x)p^*(x + D)e^{jk[W(x) - W(x+D)]}dx$$

For simplicity let $\Delta W(x,D) = [W(x) - W(x + D)]$, then- $$OTF(f) = \frac{1}{A} \int_S p(x)p^*(x + D)e^{jk\Delta W(x,D)}dx \qquad (2)$$

Euler's formula applied to eq. 2 gives- $$OTF(f) = \frac{1}{A} \int_S p(x)p^*(x + D)[\cos(k\Delta W(x,D))]dx + \ldots + \frac{j}{A} \int_S p(x)p^*(x + D)[\sin(k\Delta W(x,D))]dx$$

$OTF(f) = 1/A (a + jb)$, where-
$a = \int_S p(x)p^*(x + D)[\cos(k\Delta W(x,D))]dx$
$b = \int_S p(x)p^*(x + D)[\sin(k\Delta W(x,D))]dx$ The polar form of the OTF is given in terms of the MTF and the PTF as-
$OTF(f) = MTF(f)e^{jPTF(f)}$
where-
$MTF(f) = (a^2 + b^2)^{\frac{1}{2}}$ and $PTF(f) = \arctan\{b/a\}$ Given that $\Delta W(x,D)$ is approximately linear over the LWPA sample aperture, then- $$OTF(f) = \frac{1}{A} c\{p(x)p(x + D)\} + \frac{j}{A} s\{p(x)p(x + D)\} \qquad (3)$$

where-
c{ } = the Fourier cosine transform
s{ } = the Fourier sine transform

The modulus of the OTF is the MTF and is then expressible as- $$MTF(f) = \frac{1}{A} [(c\{p(x)p(x + D)\})^2 + (s\{p(x)p(x + D)\})^2]^{\frac{1}{2}}$$

and the corresponding OTF phase as- $$PTF(f) = \arctan\left(\frac{(s\{p(x)p(x + D)\})}{(c\{p(x)p(x + D)\})}\right)$$

where $PTF(f) = (\lambda/2\pi) \Delta W(x,D)$
Thus, the OTF can be expressed in polar form as-
$OTF(f) = MTF(f)e^{jPTF(f)}$ \qquad (4)

In the diffraction limited case, the PTF part is zero and 4 reduces to-
$OTF_D(f) = MTF_D(f)$ \qquad (5)

Equations 4 and 5 represent the global or full aperture OTF for the general and diffraction limited case respectively. A complex OQF can now be defined as- $$OQF^*(f) = \frac{OTF(f)}{OTF_D(f)} = \frac{MTF(f)e^{jPTF(f)}}{MTF_D(f)} = OQF(f)e^{jPTF(f)} \qquad (6)$$

To this point, only global transfer functions and OQF have been discussed. Similar results are dirived for local pupil regions in the following sections.

FIG. 1 presents an example full aperature in the form of a 1-dimensional rectangular slit for exemplary purposes-results are extendable to 2-D

PARTITIONED FULL APERTURE

APPENDIX A
AVERAGE VECTOR SUM DERIVATION

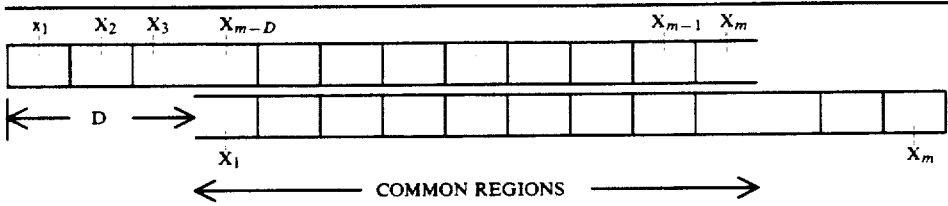

FIG. 1

As shown, the full or global aperture of FIG. 1A is partitioned into m subapertures where $X_p$ represents the central coordinate of the p-th subaperture. The shifted aperture is also shown in FIG. 1B for the demonstration of the autocorrelation process. The OTF is obtained, by the integration over the common region, as shown in the figure, of the shifted and unshifted pupils. Since the example aperture is partitioned, a local OTF can be defined for each of the m-D common subaperture pairs. The OTF for the p-th subaperture is composed of sample regions at coordinates $X_p$ and $X_{p+D}$. The local OTF for that part of the pupil circumcribed by this pair of sample apertures is then- $$OTF_p(f) = \int_{S_p} p(x_p)p^*(x_{p+D})e^{jk\Delta W(x_p,D)}dx \qquad (7)$$

Equation 7 gives the p-th local OQF for common regions defined over Sp -the intersection of regions located at coordinates $X_p$ and $X_{p-D}$.

The paired local subapertures in the common region of FIG. 1 define a system of Young's sampling apertures. For example, subapertures $X_1$ and $X_{1+D}$, $X_2$ and $X_{2+D}$, etc. form a set of Young's interferometers, wherein each pair within the set have a fixed separation distance $D = \lambda z f^*$.

In essence, each pair evaluates the quality of the full aperture on the basis of m-D discrete subaperture pairs of the common region.

From equation's 2 and 7, the global OTF is expressed in terms of local pupil contributions as- $$OTF(f) = \frac{1}{A} \sum_{p=1}^{m} \int_{S_p} p(x_p)p^*(x_{p+D})e^{jk\Delta W(x_p,D)}dx \qquad (8)$$

The corresponding diffraction limited case is- $$OTF_D(f) = \frac{1}{A} \sum_{p=1}^{m} \int_{S_p} p(x_p)p^*(x_{p+D})dx = \ldots = (m/A)OTF_p(f) = (m/A)MTF_p(f) \qquad (9)$$

The global OQF is computed as $OQF(f) = OTF(f)/OTF_D(f)$; thus, from equation's 8 and 9 we get the global OQF in terms of subapertures as- $$OQF(f) = \frac{\frac{1}{A}\sum_{p=1}^{m}\int_{S_p} p(x_p)p^*(x_{p+D})e^{jk\Delta W(x_p,D)}dx}{\frac{1}{A}\sum_{p=1}^{m}\int_{S_p} p(x_p)p^*(x_{p+D})dx}$$

Substitution of equation 4 and 5 gives a simplified expression for the global OQF as- $$OQF(f) = \frac{\sum_{p=1}^{m} MTF_p(f)e^{jkPTF_p(f)}}{(m) MTF_{D,p}(f)}$$

where $MTF_{D,p}(f)$ is the diffraction-limited MTF for the p-th Young's subaperture pair. Arithmetic operations lead to the following simplified formulas- $$OQF(f) = \frac{1}{m}\sum_{p=1}^{m}\left(\frac{MTF_p(f)}{MTF_{D,p}(f)}\right)e^{jkPTF_p(f)} = \ldots$$

$$= \frac{1}{m}\sum_{p=1}^{m}(OQF_p(f))e^{jkPTF_p(f)}$$

This equation demonstrates that the global OQF can be represented as the vector or phasor sum of the local complex OQF results. Finally, Euler's formula can be used to give the following computationally convenient form for the global OQF- $$OQF(f) = \left[\left(\frac{1}{m}\sum_{p=1}^{m} OQF_p(f)\cos(kPTF_p(f))\right)^2 + \left(\frac{1}{m}\sum_{p=1}^{m} OQF_p(f)\sin(kPTF_p(f))\right)^2\right]^{\frac{1}{2}}$$

This equation was used in obtaining the TABLE IV results. The summation components for the first term is denoted as OQF X C(PTF).

What is claimed is:

1. A method for providing correction feedback in an optical system, the optical system comprising:
   a source of radiation that can output a radiation beam; and,
   an imaging device to be corrected and which can image the radiation beam to produce an imaged beam;
   the steps of the method comprising:
   1) sampling the imaged beam by an opaque mask defining at least two apertures, for generating local wavefront errors at a pupil position defined by a location of the mask;
   2) computing a localized optical transfer function (LOTF) for the localized wavefront errors transmitted through the sampling apertures,
   the LOTF being defined by an equation:

$$LOTF(freq.) = LMTF(freq.) \times e^{(j)LPTF\,(freq.)}$$

where
LOTF = Local Optical Transfer Function;
LMTF = Local Modulation Transfer Function;

LPTF = Local Phase Transfer Function;
3) generating from the LOTF a performance map comprising
 a) a local optical quality factor (LOQF) comprising a ratio $$\frac{\text{the computed } LMTF}{\text{a diffraction limited } LMTF};$$

and,
 b) the local phase transfer function (LPTF); and,
4) generating from the performance map correction feedback for applying a controlled action to the imaging device.

2. The method according to claim 1, wherein step 1 comprises sampling the imaged beam at a spatial sampling frequency defined by a Nyquist sampling rate function.

3. The method according to claim 1, wherein step 4 comprises a step of developing an influence function from the performance map, for computing a predetermined controlled action.

4. The method according to claim 1, wherein the step 4 controlled action comprises applying a predetermined number of force actuators to the imaging device.

5. The method according to claim 1, wherein step 4 comprises applying force actuators to the imaging device at predetermined locations.

6. The method according to claim 1, wherein the step 4 controlled action comprises the step of polishing the imaging device.

7. The method according to claim 6, wherein the step 4 controlled action comprises the step of reducing high spots on a surface defined by the imaging device.

8. The method according to claim 1, wherein step 3 comprises culling from the performance map desiderata on high volume manufacturing control determinants.

* * * * *